(12) United States Patent
Carr et al.

(10) Patent No.: US 12,352,634 B1
(45) Date of Patent: Jul. 8, 2025

(54) MEISSNER-EFFECT TRANSITION-EDGE-SENSOR MICROCALORIMETER

(71) Applicant: National Technology & Engineering Solutions of Sandia, LLC, Albuquerque, NM (US)

(72) Inventors: Stephen M. Carr, Albuquerque, NM (US); Michael C. Hamel, Albuquerque, NM (US); Jesse John Bland, Albuquerque, NM (US); Christian Lew Arrington, Albuquerque, NM (US); Juan Pedro Mendez Granado, Albuquerque, NM (US); Patrick Sean Finnegan, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 475 days.

(21) Appl. No.: 18/081,405

(22) Filed: Dec. 14, 2022

Related U.S. Application Data

(60) Provisional application No. 63/293,143, filed on Dec. 23, 2021.

(51) Int. Cl.
| | |
|---|---|
| *G01K 13/00* | (2021.01) |
| *G01K 7/00* | (2006.01) |
| *G01K 7/36* | (2006.01) |

(52) U.S. Cl.
CPC ........... *G01K 13/006* (2013.01); *G01K 7/006* (2013.01); *G01K 7/36* (2013.01); *Y10T 29/49014* (2015.01)

(58) Field of Classification Search
CPC ................. G01K 7/006; G01K 7/36
See application file for complete search history.

(56) References Cited

U.S. PATENT DOCUMENTS

2017/0071082 A1* 3/2017 Sadleir .............. H05K 9/0077

OTHER PUBLICATIONS

Schaffner et al., "Inductive Method for Measuring the Local Transition Temperature of Thin Tungsten Films", AIP Conf. Proc. 1185, 187-190. (Year: 2009).*
Mauskopf, P. D., "Transition Edge Sensors and Kinetic Inductance Detectors in Astronomical Instruments", Publications of the Astronomical Society of the Pacific, 130:082001 (28pp). (Year: 2018).*

* cited by examiner

*Primary Examiner* — David P Porta
*Assistant Examiner* — Casey Bryant
(74) *Attorney, Agent, or Firm* — Mark A. Dodd

(57) ABSTRACT

A Meissner-Effect Transition-Edge-Sensor (ME-TES) microcalorimeter device may have one or more microcalorimeter elements, each including an absorber body composed of a superconductive element that is arranged to absorb incoming photons or radiative particles. A planar pickup coil substantially surrounds the absorber body and is located within a magnetic sensing distance of the absorber body. Absorption of incoming photons or radiative particles increases the temperature of the superconductive element, resulting in a change in magnetic flux through the superconductive element. This change in magnetic flux induces a transient electric current in the planar pickup coil that may be sensed using a readout circuit. A method is provided for fabricating an ME-TES microcalorimeter device.

20 Claims, 7 Drawing Sheets

100

Without tin (Sn)

← 70 μm →

With tin (Sn)

← 70 μm →

$D_{SC}$ = 20 μm $D_{SC}$ = 200 μm

MEISSNER-EFFECT TRANSITION-EDGE-SENSOR MICROCALORIMETER

RELATED APPLICATIONS

This application claims priority to U.S. Provisional Application No. 63/293,143, filed on Dec. 23, 2021, and entitled MAGNETIC SUPERCONDUCTING MICROCALORIMETER, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to Meissner-effect transition-edge-sensor microcalorimeters and to methods for their manufacture. A microcalorimeter is a detector for photons or radiative particles that measures their deposited energy by way of its conversion to heat. A Meissner-effect transition-edge-sensor microcalorimeter operates at cryogenic temperatures. It detects the generated heat from the thermal effect on a superconductor in the transition region between the normal and the superconductive states.

BACKGROUND

High-purity germanium detectors are widely used for applications such as x-ray and gamma-ray dosimetry and spectroscopy. Although these devices are very useful, the energy resolution they can achieve is limited. Resistive superconductive microcalorimeters represent one approach to achieving improved resolution, for example resolution on the scale of one electron volt. In a typical resistive superconductive microcalorimeter, an absorber body absorbs a photon or radiative particle, with the resultant temperature change of the absorber body being detected by way of the change that it causes in the electrical resistance of a superconductor to which it is thermally coupled.

Techniques that measure temperature changes in an absorber body are limited in sensitivity by the heat capacity of the absorber body. That is, the greater the heat capacity, the smaller the temperature change for a given amount of deposited energy. In the regime of high fluences of highly penetrating particles, this drawback may be offset by the high collection efficiency of relatively large absorber bodies. But in other regimes, the sensitivity can be maximized only by using a very small absorber body as a repeated element in an array of such absorber bodies, each having its own temperature sensor.

Resistive superconductive microcalorimeter arrays have been demonstrated. However, simpler elements than those currently known could make such arrays more scalable. Making these arrays at larger scale also calls for new manufacturing techniques that are likewise scalable.

SUMMARY

In the field of calorimetry, thermal detectors operate by measurement of the temperature rise induced in an active element by the absorption of incident radiation. Various embodiments of the present invention employ a new thermal detection scheme based on the Meissner effect, which is associated with the expulsion of an externally applied magnetic field from a superconductor when it undergoes a transition to the superconducting state. For this reason, a microcalorimeter in accord with one or more embodiments of the present invention is termed a Meissner-Effect Transition-Edge-Sensor (ME-TES) microcalorimeter. Various embodiments of an ME-TES microcalorimeter in accordance with the present invention use a single volume of superconductive material as both absorber and sensor.

An ME-TES microcalorimeter in accordance with one or more embodiments of the present invention offers advantages of reduced complexity and a potential for improved energy resolution relative to state-of-the-art semiconductor detectors. For example, the microscale dimensions of prior art disk detector elements in microcalorimeters necessitate operation in arrays in order to detect radiation efficiently over a practical area. But an electrical fanout poses a challenge for scaling such a prior art array of disk detector elements. An ME-TES microcalorimeter, however, can potentially simplify the physical configuration of the calorimeter and make it more scalable. This feature can be embodied, in part, using a single volume of material serving as both absorber and sensor, consequently minimizing the number of electrical leads per element.

It is also noteworthy that the sensitivity and, ultimately, the energy resolution of an ME-TES thermal detector in accordance with one or more embodiments of the present invention is not limited by the same physics as prior art semiconductor-based detectors. The fundamental thermodynamic limit for the energy resolution of an ME-TES thermal detector can be several orders of magnitude lower than the fundamental semiconductor-based limit if the ME-TES thermal detector is operated in a cryogenic temperature range far enough below that required for cooling of a semiconductor detector.

In at least one embodiment of the invention, an apparatus comprises a substrate and one or more microcalorimeter elements formed on the substrate, with each microcalorimeter element comprising an absorber body including a superconductive element (the superconductive element absorbing an incoming photon or radiative particle, wherein heating of the superconductive element due to the absorbed incoming photon or radiative particle causes a change in magnetic flux passing through the superconductive element) and a planar pickup coil that substantially surrounds the absorber body (the planar pickup coil located within a magnetic sensing distance of the absorber body, the planar pickup coil sensing the change in magnetic flux through the superconductive element).

In various embodiments, the absorber body and the planar pickup coil of each microcalorimeter element are formed of corresponding thin films on the substrate; the one or more microcalorimeter elements includes a plurality of microcalorimeter elements arranged in one of a one-dimensional or a two-dimensional array; the apparatus further comprises a thermally insulative film formed on the substrate (at least the absorber body of each microcalorimeter element being formed on the thermally insulative film); each absorber body has a diameter of between approximately 5 μm and approximately 1000 μm; the apparatus further comprises a corresponding readout circuit coupled to the planar pickup coil of each corresponding microcalorimeter element; and the apparatus further comprises a signal processor (the signal processor being individually coupled to the readout circuit of each corresponding microcalorimeter element).

In other embodiments, the apparatus further comprises a magnetic field generator (the magnetic field generator generating at least a portion of the magnetic field around or through the absorber body of each microcalorimeter element); the apparatus further comprises a cryogenic cooling system (the cryogenic cooling system maintaining the corresponding superconductive element of each of the one or more microcalorimeter elements at an operating temperature $T_0$ of approximately the transition temperature $T_C$ of the corresponding superconductive element of each of the one or more microcalorimeter elements).

In yet other embodiments, the superconductive element of each of the one or more microcalorimeter elements includes tin or a tin alloy; the superconductive element of each of the one or more microcalorimeter elements includes a gold seed layer; the superconductive element of each of the one or more microcalorimeter elements is a film with a thickness of between approximately 5 μm and approximately 14 μm; the planar pickup coil of each of the one or more microcalorimeter elements includes niobium; the planar pickup coil of each of the one or more microcalorimeter elements includes at least one of an aluminum adhesion layer or a palladium protection layer; and the planar pickup coil of each of the one or more microcalorimeter elements is a film with a thickness between approximately 300 nm and approximately 575 nm.

In at least one embodiment of the invention, a method for fabricating a microcalorimeter device comprises the steps of providing a substrate, forming a planar pickup coil on a first portion of the substrate, and forming an absorber body including a superconductive element on a second portion of the substrate, the absorber body formed such that the planar pickup coil substantially surrounds the absorber body.

In various embodiments, the substrate includes at least a portion of a silicon wafer; the superconductive element includes tin or a tin alloy; the planar pickup coil includes niobium; and the method further comprises the step of forming a thermally insulative film immediately after the step of providing the substrate, at least the absorber body being formed on the thermally insulative film, the thermally insulative film including silicon nitride.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings may or may not be to scale and are intended only to illustrate the elements of various embodiments of the present invention.

DETAILED DESCRIPTION

As illustrated in FIGS. 1A-1D, a Meissner-Effect Transition-Edge-Sensor (ME-TES) microcalorimeter 100 in accordance with one or more embodiments of the present invention utilizes the magnetic superconducting transition for transduction from temperature to magnetic flux. The ME-TES 100 uses a single superconductor element 110, as both absorber and sensor.

The ME-TES microcalorimeter 100 may be utilized for the thermal detection of incident radiation 120, in particular, radiation in the x-ray and gamma-ray regions of the electromagnetic spectrum. The ME-TES microcalorimeter 100 operates by measurement of the temperature rise induced in the ME-TES microcalorimeter 100 by the absorption of the incident radiation 120. As suggested by the prefix "micro," each ME-TES microcalorimeter 100 must be small enough that the deposited energy due to absorbing an x-ray or gamma-ray photon in the incident radiation 120 is sufficient to produce a measurable temperature rise of the superconductor element 110.

Figure 1A:
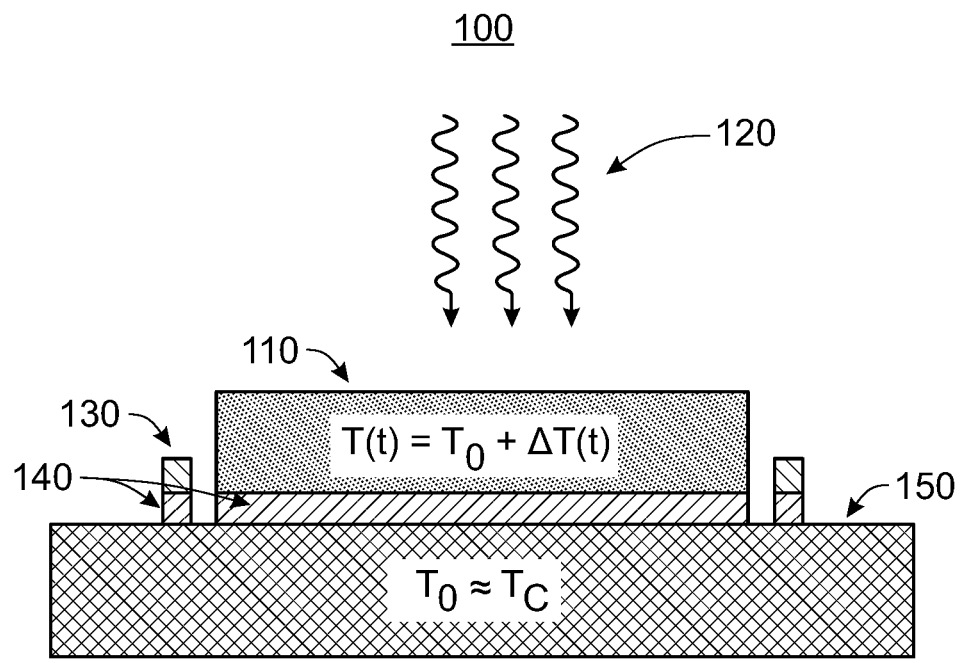
FIGS. 1A-1D illustrate a Meissner-Effect Transition-Edge-Sensor (ME-TES) microcalorimeter in accordance with one or more embodiments of the present invention and its principle of operation.
Figure 1B:
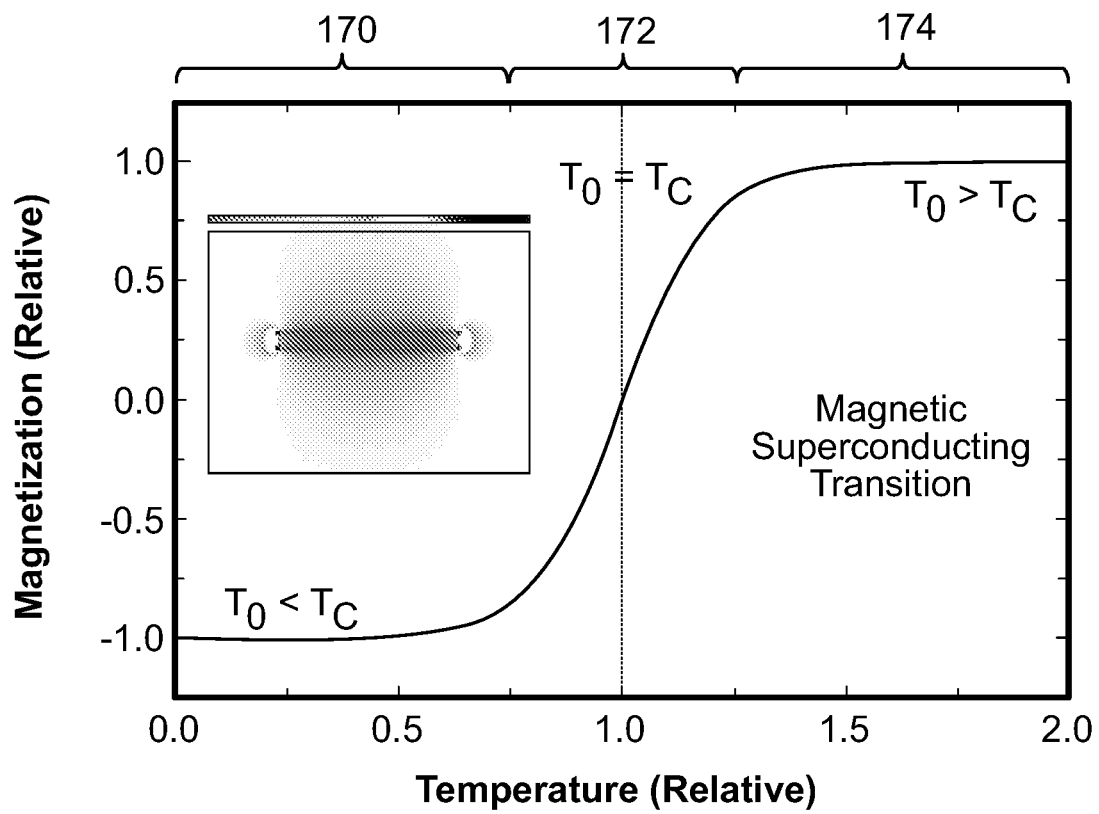
Figure 1C:
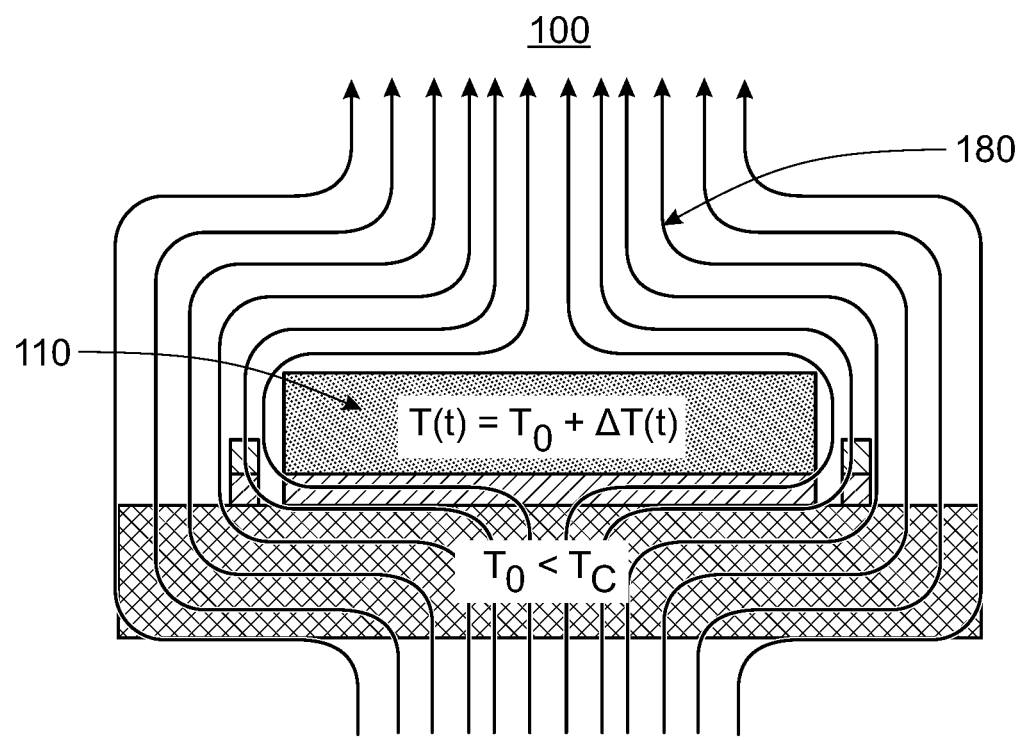
Figure 1D:
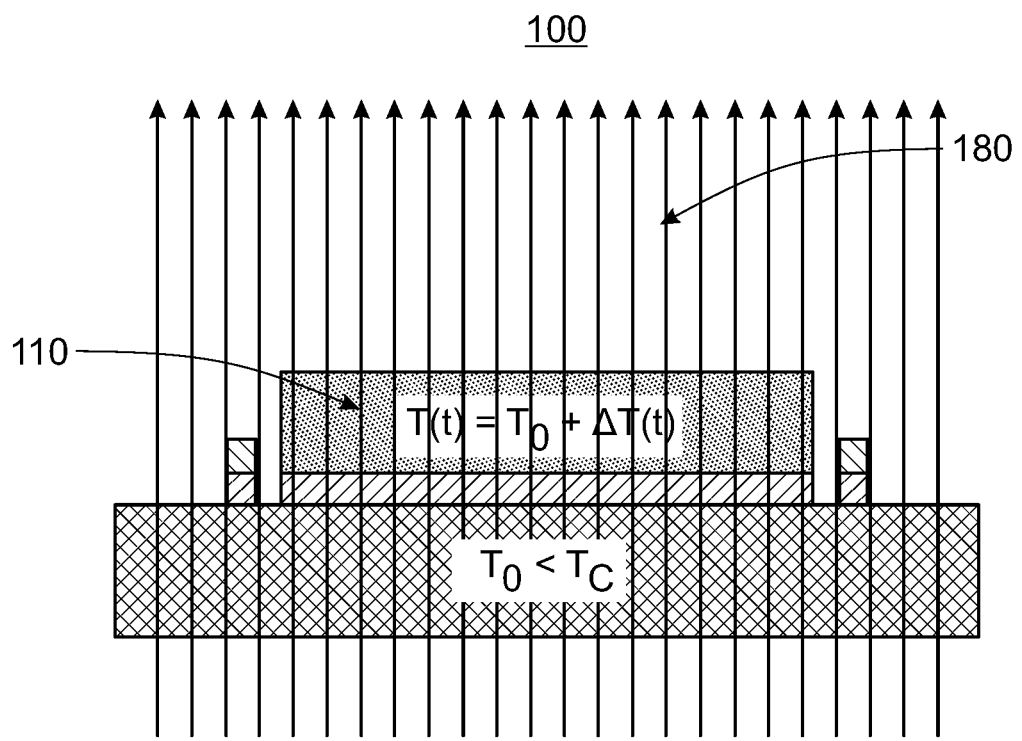

The magnetic superconducting transition illustrated in FIG. 1B can be divided into the three labeled regions based upon the operating temperature $T_0$ and the transition temperature $T_C$ of the superconductor element 110: $T_0<T_C$, which may be referred to as the Meissner regime 170; $T_0 \approx T_C$, which may be referred to as the transition regime 172; and $T_0>T_C$, which may be referred to as the normal regime 174. For $T_0<T_C$ in the Meissner regime 170, an externally applied magnetic field 180 is completely expelled from the superconductor element 110, resulting in the net magnetic field distribution schematically illustrated as lines in FIG. 1C. This is because the superconductor element 110 generates its own opposing magnetic field through what is known as the Meissner effect, which effectively cancels the externally applied magnetic field 180 within the superconductor element 110. For $T_0>T_C$ in the normal regime 174, the externally applied magnetic field 180 freely penetrates the superconductor element 110, resulting in the net magnetic field distribution schematically illustrated as lines in FIG. 1D. In each case, the externally applied magnetic field 180 is generated by a magnetic field generator (not illustrated), for example, a coil through which a current passes or a permanent magnet. Note that while this magnetic field generator may generate the externally applied magnetic field 180 local to each individual superconductor element 110, a larger magnetic field generator that generates a global externally applied magnetic field 180 for all of the superconductor elements 110 in an array may be preferable in certain embodiments.

For $T_0 \approx T_C$ in the transition regime 172, the externally applied magnetic field 180 is partially expelled from the superconducting element 110. It is this partial expulsion of the externally applied magnetic field 180 in the transition regime 172 that is utilized for transduction from temperature to magnetic flux. A temperature rise ΔT(t) of the superconductor element 110 due to the incident radiation 120 results in less expelled externally applied magnetic field 180. This change in magnetic flux passing through the superconductor element 110 may be detected by a proximal detector, i.e., a detector situated within a magnetic coupling distance of the superconductor element 110. Stated differently, the ME-TES microcalorimeter 100 detects a change in the magnetic flux, i.e., a change in the integrated product of the magnetic field and the area enclosed by the planar pickup coil 130. In the ME-TES microcalorimeter 100 of FIG. 1A, the proximal detector is the co-fabricated planar pickup coil 130.

For the best possible magnetic coupling, the separation S between the superconductor element 110 and the planar pickup coil 130 (defined below) should be as small as possible. Typically, lithographic fabrication limitations dictate this distance, resulting in, for example, a minimum separation of approximately 0.5 µm. This minimum separation may be compared with the diameter $D_{SC}$ of the superconductor element 110, which is in the range of approximately $D_{SC}$=5 µm to 1000 µm and is typically on the order of tens of micrometers. The ME-TES microcalorimeter 100 further includes a thermally insulative film 140 located between both the planar pickup coil 130 and the superconductor element 110, and a substrate 150.

The inset of FIG. 1B illustrates a simulation result of the net magnetic field near the superconductor element 110 for a fixed temperature rise ΔT(t) of the superconducting element 110. Within the interior of the superconductor element 110, the net magnetic field is positive, while near the lateral edges of the superconductor element 110, the net magnetic field is negative. Far from the superconductor element 110, the net magnetic field is the externally applied magnetic field 180.

Figure 2A:
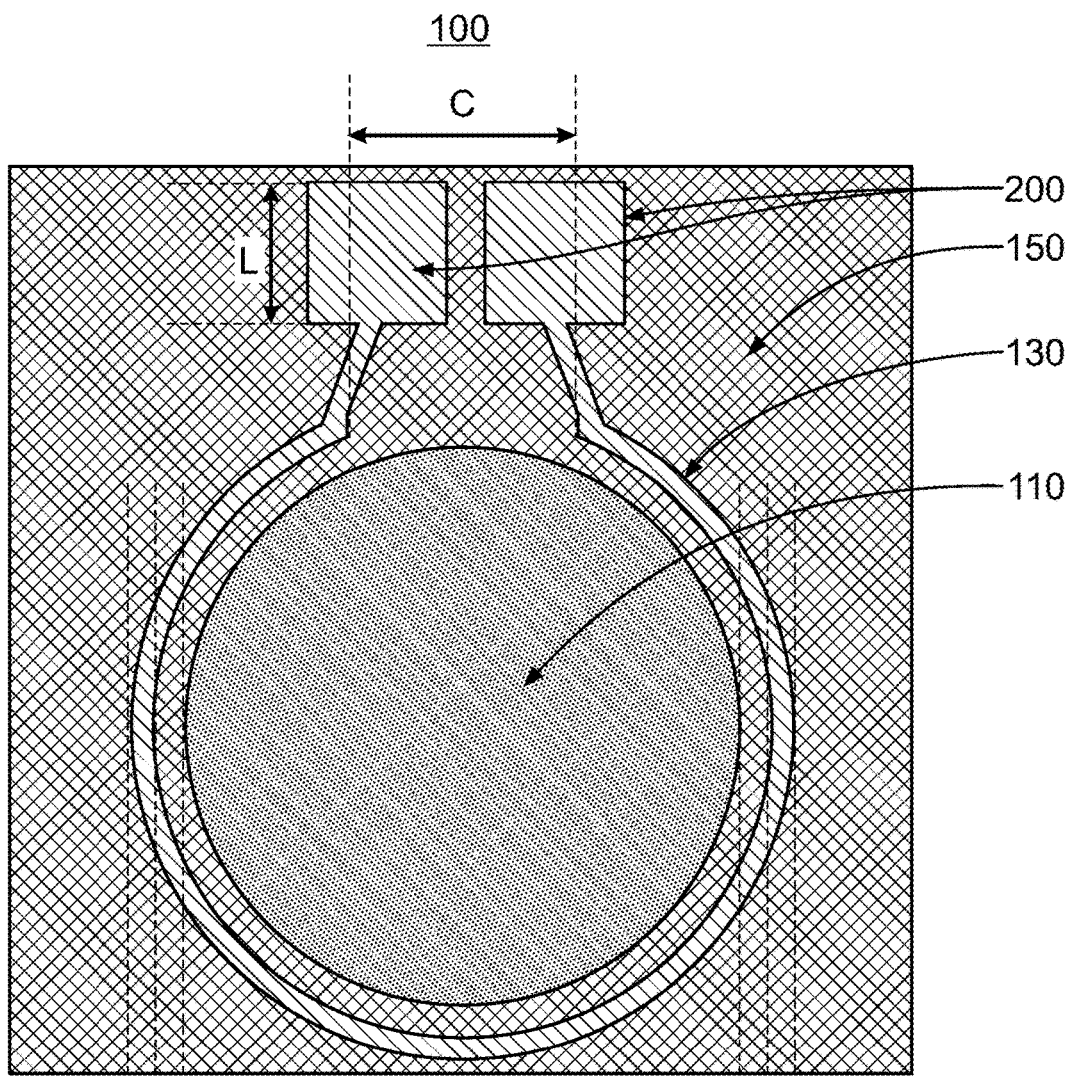
FIGS. 2A and 2B schematically illustrate a single element of an ME-TES microcalorimeter in accordance with one or more embodiments of the present invention.
Figure 2B:
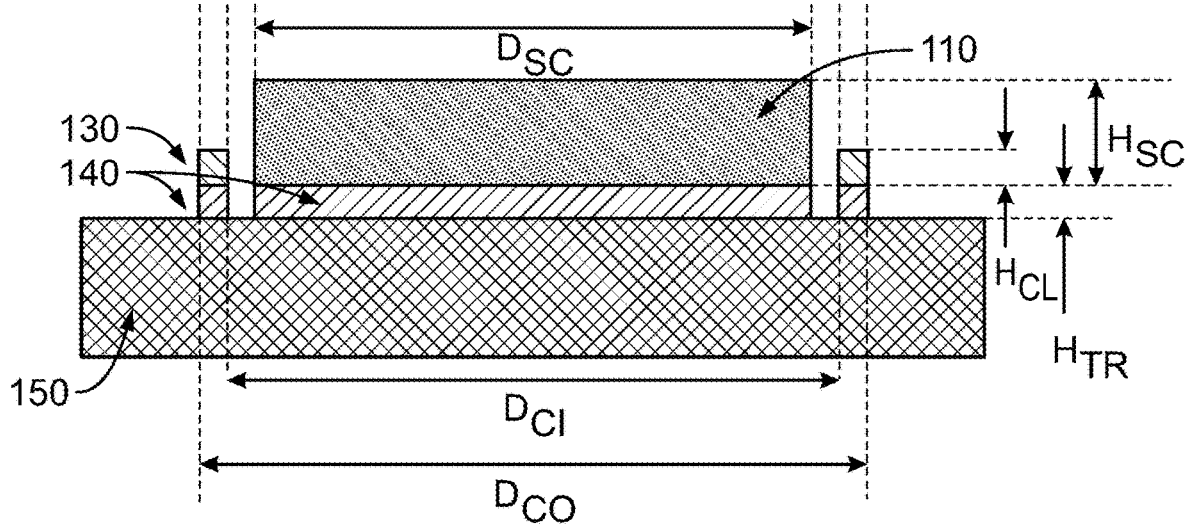

A schematic (not to scale) drawing of the ME-TES microcalorimeter 100 is shown in FIGS. 2A and 2B, with a top view in FIG. 2A and a cross-sectional view in FIG. 2B. Parameters defined symbolically in FIGS. 2A and 2B include the diameter $D_{SC}$ of the superconductor element 110; the inner diameter $D_{CI}$ of the planar pickup coil 130; the outer diameter $D_{CO}$ of the planar pickup coil 130; the thickness $H_{TR}$ of the thermally insulative film 140; the thickness HCL of the planar pickup coil 130; the thickness $H_{SC}$ of the superconductor element 110; the gap C in the circumference of the planar pickup coil 130; and the linear dimension L of the bond pads 200 used to electrically connect to the planar pickup coil 130.

In the design illustrated in FIGS. 2A and 2B, the presence of the thermally insulative film 140 beneath the planar pickup coil 130 is a consequence of the fabrication process. The thermally insulative film 140 beneath the planar pickup coil 130 is not essential to the operation of the ME-TES microcalorimeter 100, and in some embodiments may be omitted. In contrast, the thermally insulative film 140 is included between the superconductor element 110 and the substrate 150 in order to provide partial thermal isolation between the superconductor element 110 and the substrate 150.

The planar pickup coil 130 substantially surrounds the superconductor element 110, i.e., more than halfway around. For purposes of magnetic coupling, the size of the gap C is secondary to the separation S between the superconductor element 110 and the planar pickup coil 130. However, it will generally be advantageous to set C to as small a value as possible, which will typically be limited by fabrication tolerances. In demonstration ME-TES microcalorimeters, C was as small as approximately 5 µm. At a value of 5 µm, C is about one-third the circumference of a 5-µm-diameter superconductor element 110 and about 1/600 the circumference of a 1000-µm-diameter superconductor element 110.

Parameters that may be derived from FIGS. 2A and 2B include the separation $S=[(D_{CI}-D_{SC})/2]$ or gap between the outer diameter $D_{SC}$ of the superconductor element 110 and the inner diameter $D_{CI}$ of the planar pickup coil 130; and the width $W=[(D_{CO}-D_{CI})/2]$ of the planar pickup coil 130. To maximize the change in magnetic flux within the area enclosed by the planar pickup coil 130, the following are considerations for the design: minimization of the separation $S=[(D_{CI}-D_{SC})/2]$; minimization of the width $W=[(D_{CO}-D_{CI})/2]$; and minimization of the gap C in the circumference of the planar pickup coil 130.

ME-TES microcalorimeter elements, i.e., pixels, consisting of superconducting elements in the form of micro-disks separated from a substrate by a thin thermally insulative film, as illustrated schematically (not to scale) in FIGS. 1A-1D and FIGS. 2A and 2B, were fabricated. These micro-disk-based ME-TES microcalorimeter elements were realized using a novel microfabrication process consisting of a combination of optical lithography and electrodeposition of the superconducting elements, as shown (to scale) in FIGS. 3A-3F. While the ME-TES microcalorimeter elements illustrated schematically in FIGS. 1A-1D and FIGS. 2A and 2B are micro-disks, other shapes may be employed. Note, however, that the corners of ME-TES microcalorimeter elements in the form of micro-squares or micro-rectangles may be problematic with respect to magnetic field concentration and corresponding detection.

Figure 3A:
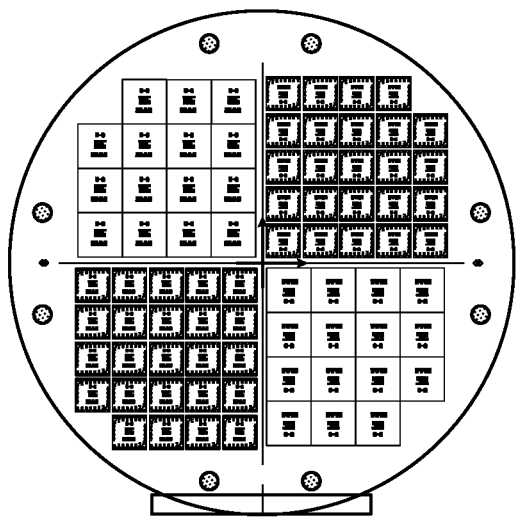
FIGS. 3A-3F are photographic images showing views of ME-TES microcalorimeters in accordance with one or more embodiments of the present invention in various stages of fabrication and of various sizes.
Figure 3B:
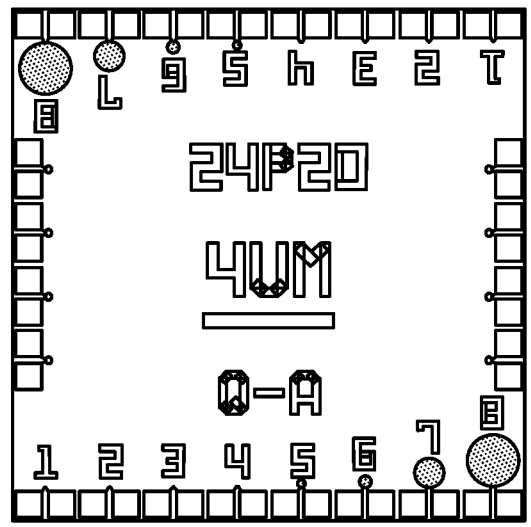
Figure 3C:
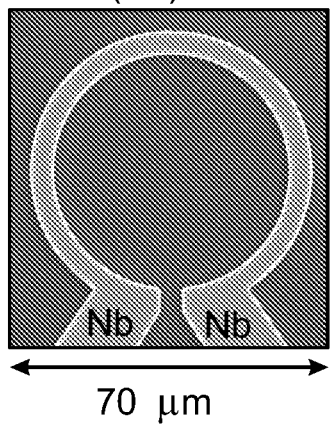
Figure 3D:
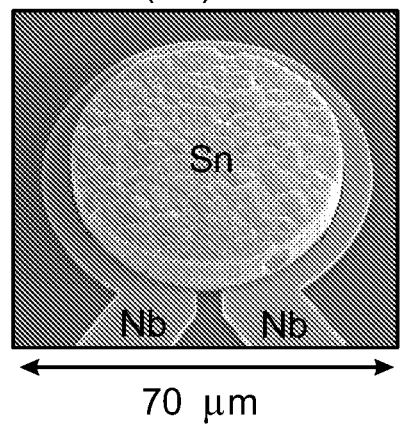
Figure 3E:
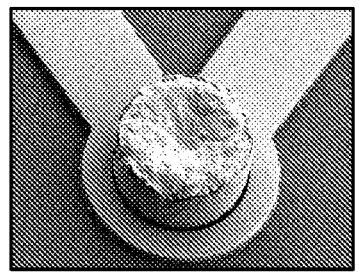
Figure 3F:
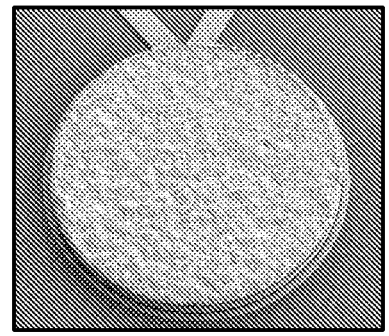

A silicon wafer, as illustrated in FIG. 3A, constituted the starting material for the microfabrication process. Following wafer-level processing, the wafer was cleaved into four quarter-wafers defined by the four quadrants illustrated in FIG. 3A. Each quarter-wafer subsequently underwent electroplating of the superconductor elements followed by additional microfabrication processes to fully define the ME-TES microcalorimeter elements. Following characterization at the quarter-wafer level, a quarter-wafer was diced into individual die containing various arrays of ME-TES microcalorimeter elements, for example, as illustrated in FIG. 3B.

Individual ME-TES microcalorimeter elements are illustrated in FIGS. 3C-3F, where each image is a scanning electron microscope (SEM) micrograph. ME-TES elements with diameters from $D_{SC}$=5 µm to $D_{SC}$=1000 µm, separations S≥0.5 µm, and widths W≥5 µm were fabricated.

The initial ME-TES elements illustrated in FIGS. 3A-3F consist of the following materials: Tin for the superconducting elements; silicon nitride for the thermally insulative film; niobium/palladium for the planar pickup coil; and silicon for the substrate. The choice of material for the superconducting elements, and its corresponding superconducting transition temperature $T_C$, must be compatible with the temperature range of the experimental cryogenic measurement system, as the ME-TES elements must be operated in the transition regime 172, i.e., at $T_0 \approx T_C$, as illustrated in FIG. 1B. In other embodiments, other superconducting materials may be employed, including, for example, other elemental superconductors, superconducting alloys, and superconducting bilayers consisting of a superconducting layer and a non-superconducting normal metal layer.

For the planar pickup coil in an example fabrication process, an adhesion layer of aluminum, approximately 5 nm in thickness, was deposited. This was followed by a layer of niobium, having a thickness of between approximately 250 nm and 500 nm. The aluminum and niobium layers were deposited in series, without breaking the vacuum, in a sputtering deposition chamber. A palladium layer was added for protecting the niobium from oxidation, and to provide a suitable surface for wirebonding. The palladium layer was deposited by electron-beam evaporation, with a targeted thickness of between approximately 50 nm and 70 nm. In various embodiments, the overall thickness of the planar pickup coil may thus be between approximately 300 nm and 575 nm. The planar pickup coil may be patterned in one of two ways. A lift-off process may be used in which a layer of photoresist is patterned before deposition of the aluminum, niobium, and palladium layers. Alternatively, an etch process may be used in which the aluminum, niobium, and palladium layers are deposited before a layer of photoresist is patterned, with an etch removing the aluminum, niobium, and palladium layers not protected by the photoresist.

The choice of niobium-palladium for the planar pickup coil was particularly advantageous due to the use of a superconducting quantum interference device (SQUID) in the readout circuit. Superconductivity of the niobium offers a low impedance to the SQUID, as needed for it to operate effectively, as well as no Johnson-Nyquist noise.

Subsequently, the tin for the superconducting elements is electrodeposited on a seed layer of gold. Specifically, the tin is selectively deposited only on the seed layer through openings in a patterned photoresist (different from the patterned photoresist used to define the planar pickup coil). An example thickness for the tin layer is approximately 10 µm.

While the fabrication process is described as being a series of steps that are performed in a sequence, it is to be understood and appreciated that the fabrication process is not limited by the order of the sequence. For example, some steps can occur in a different order than what is described herein. In addition, a step can occur concurrently with another step. Further, in some instances, not all steps may be required to implement the fabrication process.

Figure 4:
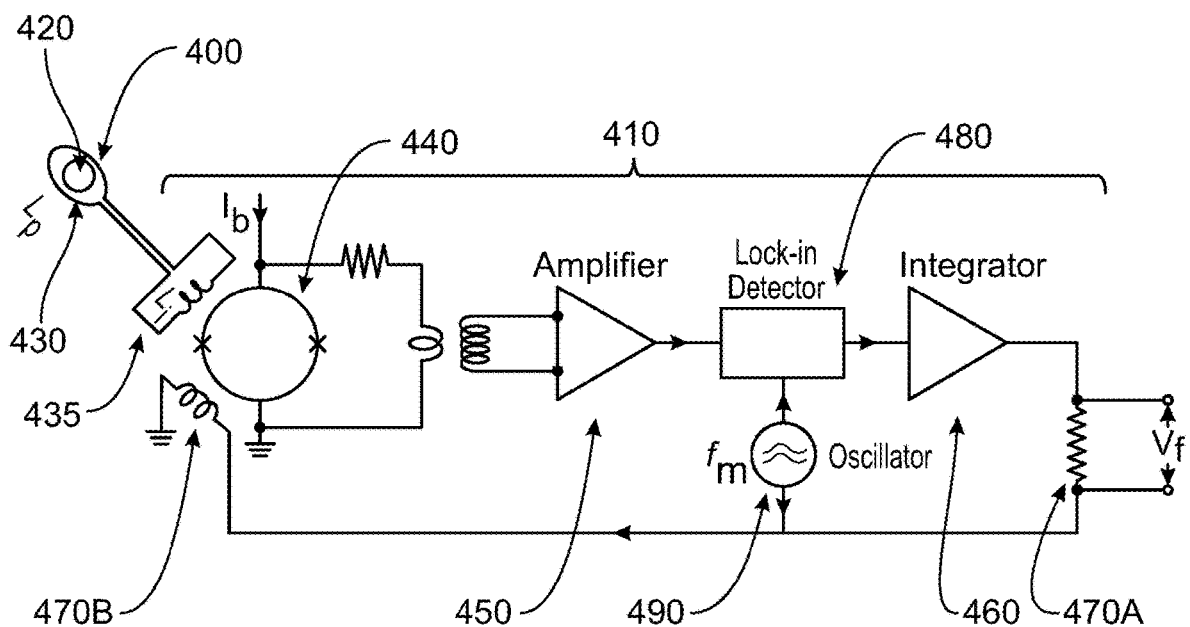
FIG. 4 is a schematic circuit diagram of a readout circuit coupled to an ME-TES microcalorimeter element in accordance with one or more embodiments of the present invention.

Readout of the magnetic flux-change signal from a ME-TES device 400 may be performed using the readout circuit 410 illustrated in FIG. 4, which is offered as a non-limiting example. The superconductor element 420 in FIG. 4 corresponds to the superconductor element 110 in FIG. 2A. The planar pickup coil 430 (with inductance $L_p$) in FIG. 4 corresponds to the planar pickup coil 130 in FIG. 2A. The planar pickup coil 430 is coupled to a SQUID 440 via an input coil 435 (with inductance $L_i$).

Versions of the readout circuit 410 shown in FIG. 4 are available as commercial packages based on an established design. See, for example, J. Clarke and A. I. Braginski, "The SQUID Handbook," Wiley-VCH Verlag, 2004), the contents of which are incorporated herein by reference. The readout circuit 410 in FIG. 4 is based on the SQUID 440 consisting of two Josephson junctions connected in parallel in a superconducting loop biased with a current Ib. The SQUID 440 may be viewed as a cryogenic magnetic flux-to-voltage converter/amplifier.

The thermal change in the superconductor element 420, due to absorption of a photon or radiative particle, causes a current pulse in the planar pickup coil 430, which is read by the SQUID 440. Processing of the output signal from the readout circuit 410, either in real time or subsequently from stored data, may include integration over time to obtain a measurement of absorbed energy.

Commercially available versions of the readout circuit 410 may include the SQUID 440 together with the additional circuit elements illustrated in FIG. 4 that enable operation in a closed-loop feedback or "flux-lock" mode. The flux-lock mode serves to linearize the response, i.e., voltage, of the SQUID 440, and provide functional dynamic range. In flux-lock mode, the deviation of the voltage from the SQUID 440 from the working point is amplified by an amplifier 450, and serves as one input to a lock-in detector 480. An oscillator 490 generates a reference frequency that serves as a second input to the lock-in detector 480 and is provided to a feedback coil 470B. The output of the lock-in detector is then integrated by an integrator 460, and fed back into the SQUID 440 via a feedback resistor 470A and the feedback coil 470B which is magnetically coupled to the SQUID 440 via a mutual inductance. In the flux-lock mode, a magnetic flux applied to the SQUID 440 by a current flowing in the input coil 435 is cancelled by an opposing magnetic flux in the feedback coil 470B that is likewise coupled to the inductance of the SQUID 440. A change in the magnetic flux through the SQUID 440 results in an in-phase or out-of-phase signal at the reference frequency, depending on the sign of the magnetic flux change, at the first input to the lock-in detector 480. Thus, the output of the lock-in detector 480 is a voltage proportional to the change in the magnetic flux applied to the SQUID 440. The current flowing in the input coil 435 may, for example, correspond to a change in magnetic flux sensed by the pickup coil 430. As those ordinarily skilled in the art will recognize, readout circuits of various other designs could be used as alternatives, or as complements, to the readout circuit 410 illustrated in FIG. 4.

While not illustrated in FIG. 4, at least the ME-TES device 400, with its superconductor element 420 and planar pickup coil 430, the input coil 435, the SQUID 440, with its two Josephson junctions and superconducting loop, and the feedback coil 470B are all located within a cryogenic cooling system. The cryogenic cooling system is used to achieve the operating temperature $T_0$ corresponding to approximately the transition temperature $T_C$ of the superconductor element 420.

Several factors should be considered when selecting the dimensions for the superconductor element. For the area (at constant thickness), there is a tradeoff between temperature signal, which is stronger for smaller areas, and probability of photon detection, which is greater for larger areas. A smaller probability of photon detection generally leads to longer count times. There is also a practical lower limit of approximately 5 µm for the diameter of the superconductor element because of limitations of the fabrication process.

For the thickness (at constant area) for the superconductor element, there may be a similar, but weaker, tradeoff, as decreasing the thickness will lead to a stronger temperature signal, but may reduce the absorption probability for the photons or radiative particles that are to be detected. There is a practical limit on the thickness of the superconductor element when its deposition is masked by a resist, because undesirable overplating will result if the deposition proceeds to a thickness greater than the resist. There are also length scales associated with the superconductivity that place a fundamental limit on how thin the superconductor element can be made. These are the coherence length and the penetration depth, which are typically on the order of one micrometer or less. The result is that the thickness of the superconductor element in various embodiments is preferably between approximately 5 µm and 14 µm.

Figure 5A:
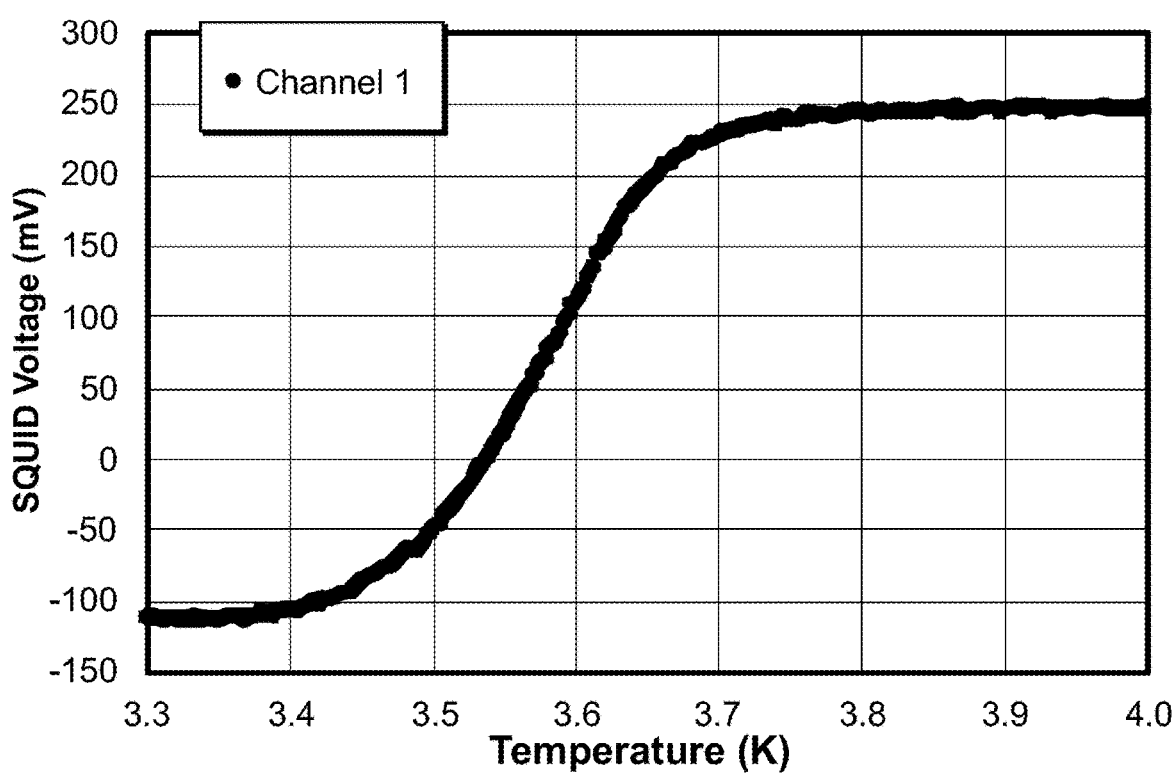
FIGS. 5A and 5B illustrate the measured responses of two complementary ME-TES elements in accordance with one or more embodiments of the present invention.
Figure 5B:
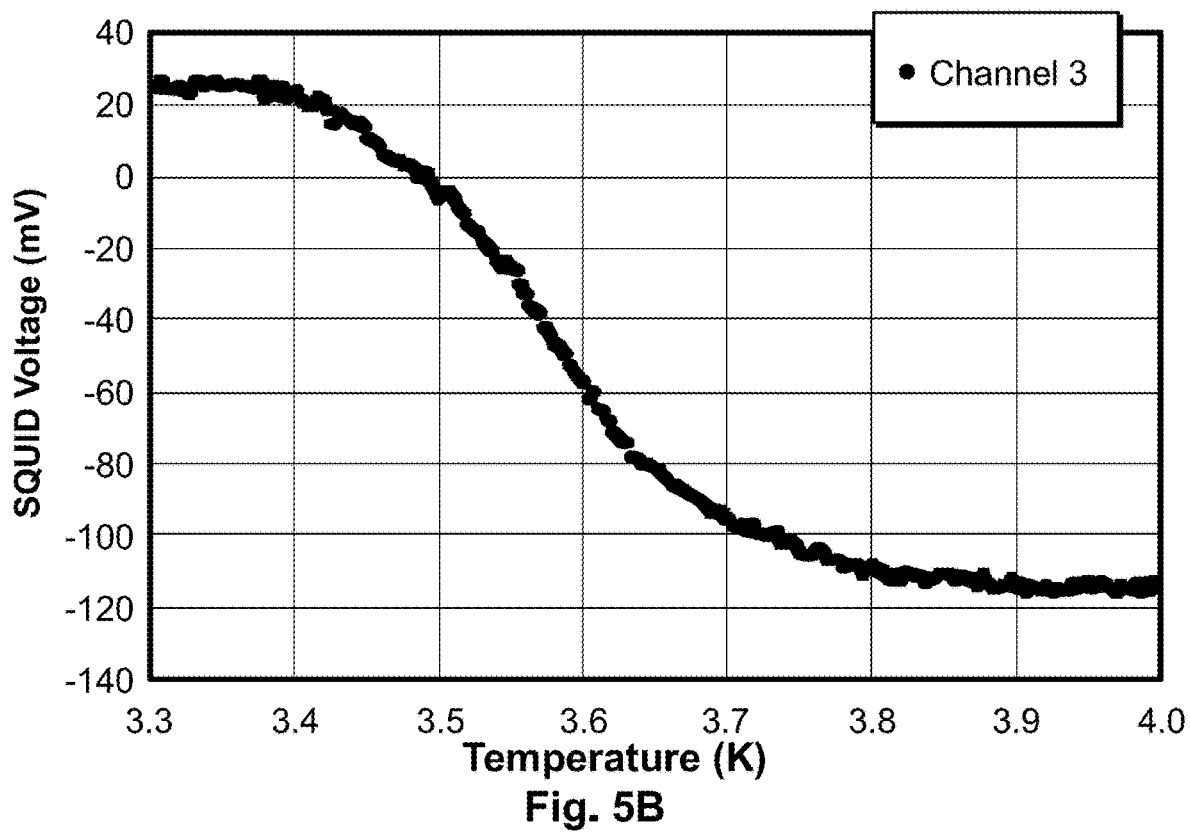
Figure 6A:
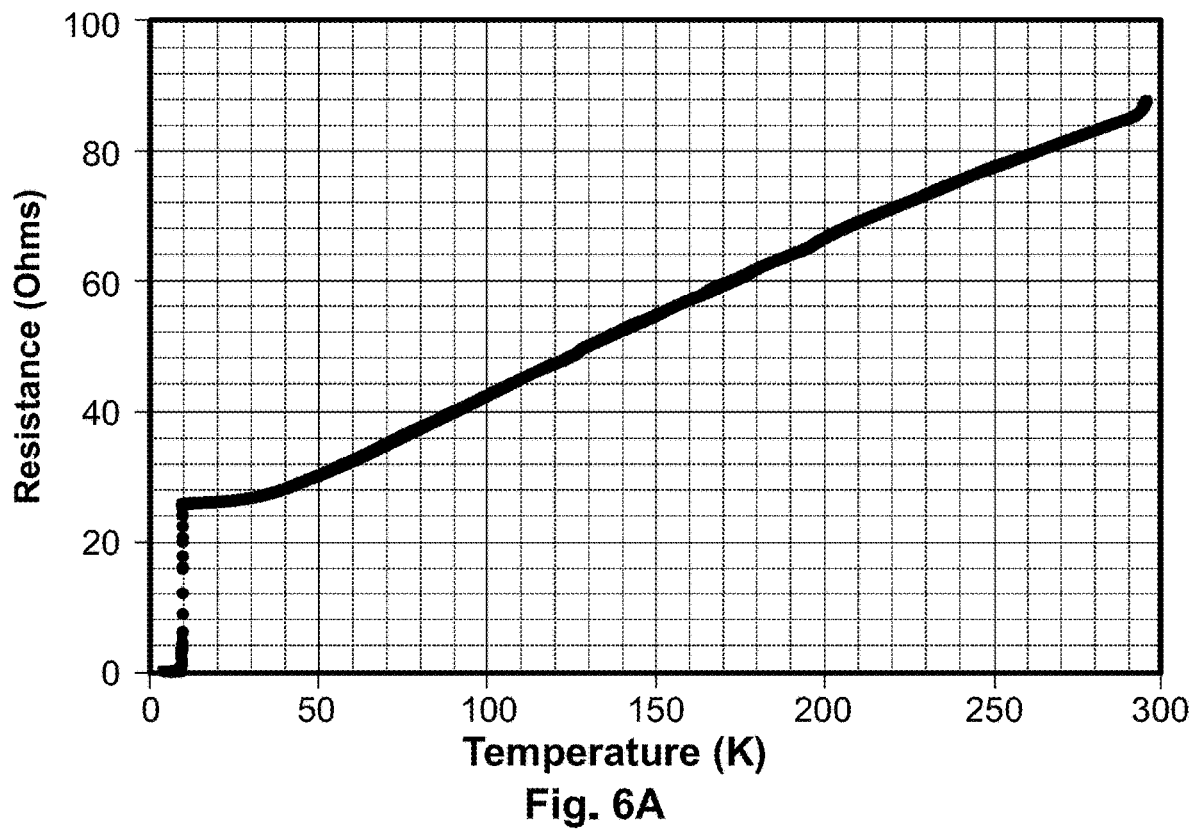
FIGS. 6A and 6B illustrate the measured resistance of the planar pickup coil for an ME-TES element in accordance with one or more embodiments of the present invention.
Figure 6B:
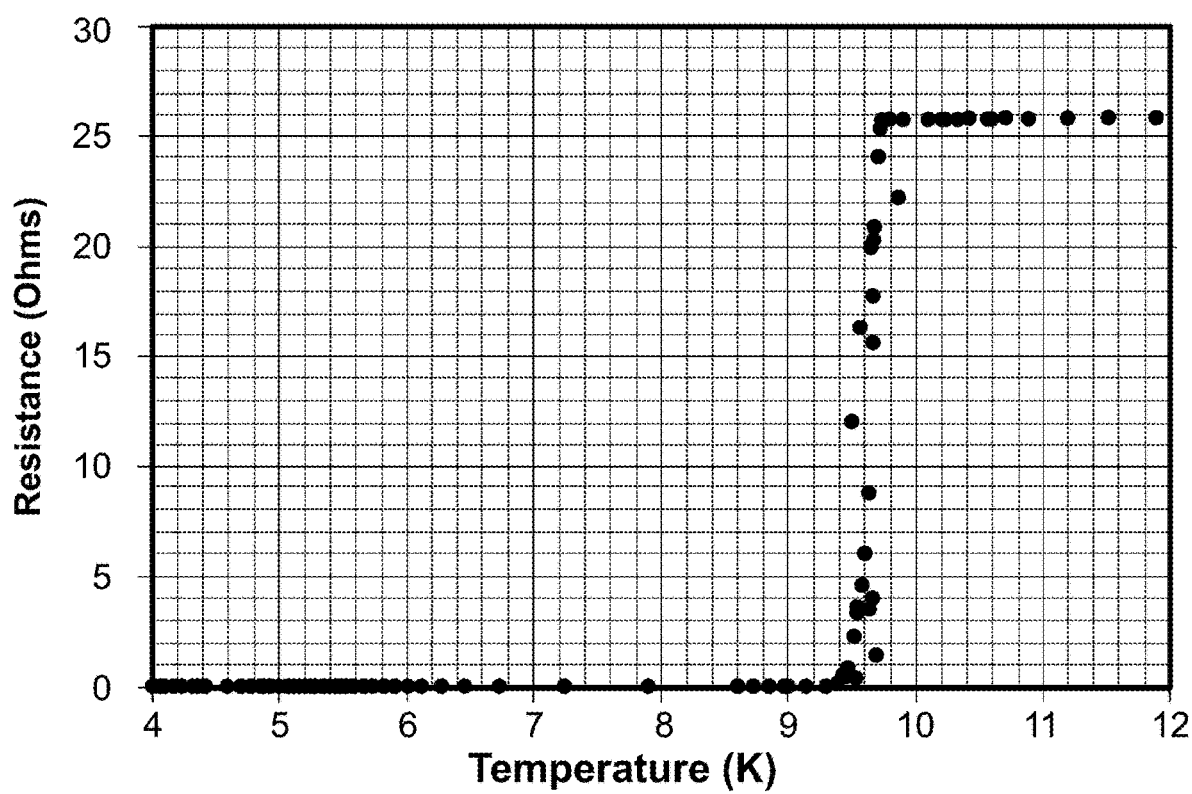

By way of example, both linear and two-dimensional arrays with densities of up to 64 superconductor elements per $cm^2$ have been fabricated using the above methods. In at least some examples of a measurement system that includes an array of superconductor element as described above, a signal processor would be individually connected to each element of the array for processing of its corresponding readout signal. FIGS. 5A and 5B illustrate the measured responses of two complementary ME-TES elements with a $T_C$ of approximately 3.55 K. FIGS. 6A and 6B illustrate the measured resistance of the planar pickup coil for an ME-TES element, showing a $T_C$ of approximately 9.5 K for the planar pickup coil.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a substrate; and
   one or more microcalorimeter elements formed on the substrate, each microcalorimeter element comprising:
   an absorber body including a superconductive element, the superconductive element adapted to absorb an incoming photon or radiative particle, wherein heating of the superconductive element due to the absorbed incoming photon or radiative particle causes a change in magnetic flux passing through the superconductive element; and
   a planar pickup coil that substantially surrounds the absorber body, the planar pickup coil located within a magnetic sensing distance of the absorber body, the planar pickup coil adapted to sense the change in magnetic flux through the superconductive element.

2. The apparatus of claim 1, wherein the absorber body and the planar pickup coil of each microcalorimeter element are formed of corresponding thin films on the substrate.

3. The apparatus of claim 1, wherein the one or more microcalorimeter elements includes a plurality of microcalorimeter elements arranged in one of a one-dimensional or a two-dimensional array.

4. The apparatus of claim 1, further comprising a thermally insulative film formed on the substrate, at least the absorber body of each microcalorimeter element being formed on the thermally insulative film.

5. The apparatus of claim 1, wherein each absorber body has a diameter of between approximately 5 µm and approximately 1000 µm.

6. The apparatus of claim 1, further comprising a corresponding readout circuit coupled to the planar pickup coil of each corresponding microcalorimeter element.

7. The apparatus of claim 6, further comprising a signal processor, the signal processor being individually coupled to the readout circuit of each corresponding microcalorimeter element.

8. The apparatus of claim 1, further comprising a magnetic field generator adapted to generate at least a portion of the magnetic field around or through the absorber body of each microcalorimeter element.

9. The apparatus of claim 1, further comprising a cryogenic cooling system adapted to maintain the corresponding superconductive element of each of the one or more microcalorimeter elements at an operating temperature $T_0$ of approximately the transition temperature $T_C$ of the corresponding superconductive element of each of the one or more microcalorimeter elements.

10. The apparatus of claim 1, wherein the superconductive element of each of the one or more microcalorimeter elements includes one of tin or a tin alloy.

11. The apparatus of claim 1, wherein the superconductive element of each of the one or more microcalorimeter elements includes a gold seed layer.

12. The apparatus of claim 1, wherein the superconductive element of each of the one or more microcalorimeter elements is a film with a thickness of between approximately 5 µm and approximately 14 µm.

13. The apparatus of claim 1, wherein the planar pickup coil of each of the one or more microcalorimeter elements includes niobium.

14. The apparatus of claim 1, wherein the planar pickup coil of each of the one or more microcalorimeter elements includes at least one of an aluminum adhesion layer or a palladium protection layer.

15. The apparatus of claim 1, wherein the planar pickup coil of each of the one or more microcalorimeter elements is a film with a thickness between approximately 300 nm and approximately 575 nm.

16. A method for fabricating a microcalorimeter device, comprising the steps of:
   providing a substrate;
   forming a planar pickup coil on a first portion of the substrate; and
   forming an absorber body including a superconductive element on a second portion of the substrate, the absorber body formed such that the planar pickup coil substantially surrounds the absorber body.

17. The method of claim 16, wherein the substrate includes at least a portion of a silicon wafer.

18. The method of claim 16, wherein the superconductive element includes one of tin or a tin alloy.

19. The method of claim 16, wherein the planar pickup coil includes niobium.

20. The method of claim 16, further comprising the step of forming a thermally insulative film immediately after the step of providing the substrate, at least the absorber body being formed on the thermally insulative film, the thermally insulative film including silicon nitride.

* * * * *